Nov. 20, 1951     C. J. SCRANTON ET AL     2,575,639
AUGER TYPE FEEDING DEVICE FOR SILAGE BLOWERS
Filed Nov. 30, 1945     2 SHEETS—SHEET 2

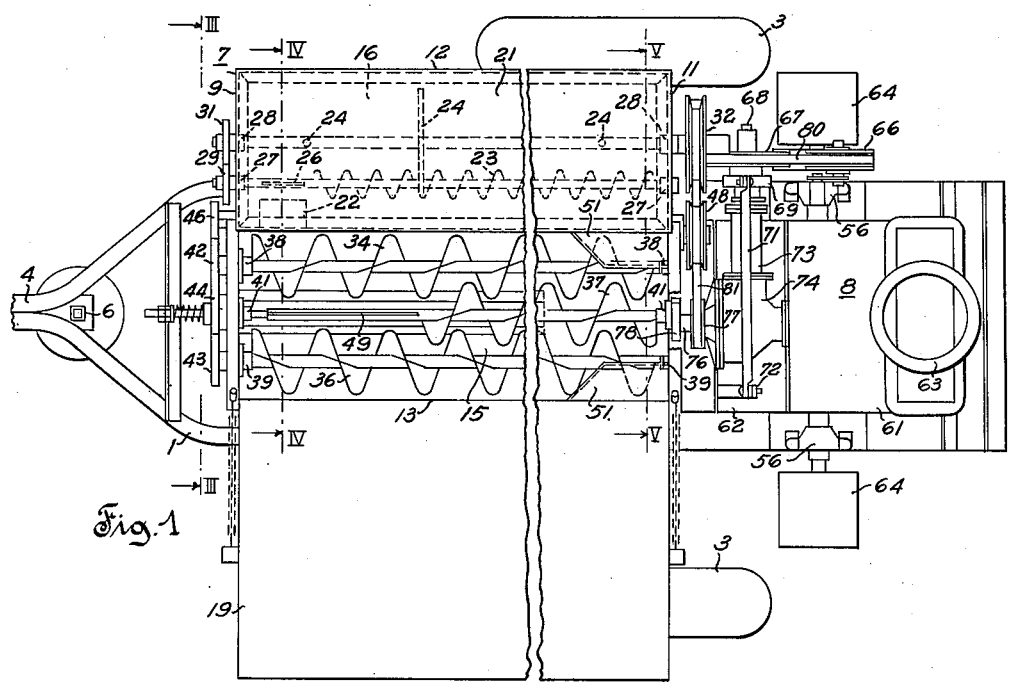

Inventors
Charles J. Scranton
Brantford S. Elliott
by K. S. Wyman
Attorney

Patented Nov. 20, 1951

2,575,639

UNITED STATES PATENT OFFICE 2,575,639

AUGER-TYPE FEEDING DEVICE FOR SILAGE BLOWERS

Charles J. Scranton and Brantford G. Elliott, La Porte, Ind., assignors to Allis-Chalmers Manufacturing Company, Milwaukee, Wis., a corporation of Delaware Application November 30, 1945, Serial No. 632,066

7 Claims. (Cl. 222—238)

This invention relates generally to the conveying of material from one place to another, and more particularly to apparatus of the type including a material-receiving, hopper-like structure and means for discharging comminuted material from the hopper, and if desired, for confiningly conveying the discharged material to a point remote from the hopper.

And an object of the present invention is to provide a hopper-like structure of the type adapted to be suddenly completely or partially filled with a compactible adherent mass of comminuted material, with a discharge opening in an end wall thereof and with a plurality of material moving devices combined for coaction with each other and with the discharge opening in a manner affording a simplified, durable and practical mechanism for effecting a continuous maximum flow of material through the discharge opening with a minimum degree of compacting action.

Still another object of the present invention is to provide a hopper-like structure of the type adapted to be suddenly completely or partially filled with a compactible adherent mass of comminuted material, with means for introducing a preservative material into the hopper adjacent the bottom thereof, with a discharge opening in an end wall thereof, and with a plurality of material moving devices combined for coaction with each other and with the discharge opening in a manner effecting a suitable mixing of the preservative and comminuted materials and a continuous maximum flow of the resulting mixture through the discharge opening with a minimum degree of compacting action.

Still another object of the present invention is to provide an apparatus of the type hereinabove mentioned wherein parts including a hopper, means for removing material therefrom and an encased rotary impeller are constructed and combined for coaction in a manner effective to deliver a continuous and uniform stream of comminuted material into the outer peripheral path of the impeller element without effecting a material change in the direction the material is traveling in passing out of the hopper.

Still another object of the present invention is to provide an improved apparatus for conveying comminuted material from a hopper to a point of discharge remote therefrom wherein the hopper is provided with an outlet opening in an end wall thereof and with means for moving a continuous and uniform stream of such material through said outlet opening with a minimum degree of compacting action, and wherein the conveying apparatus includes an encased rotary impeller disposed adjacent the outlet opening in the hopper and having a tangential inlet portion enclosing said opening and extending away from said hopper in the general direction the material is traveling in pass through said opening.

Still another object of the present invention is to provide an improved apparatus for conveying comminuted material from a hopper to a point of discharge remote therefrom wherein the hopper is provided with an outlet opening in a wall thereof and with means for moving a continuous stream of such material to and through the outlet opening, and wherein the conveying means comprises an encased rotary impeller disposed adjacent the outlet opening in the hopper and having its axis of rotation disposed generally at right angles with respect to the direction the material is traveling as it passes through said opening, said encased impeller also having an inlet portion extending tangentially upward from the rotor casing in a direction opposite to the direction of impeller rotation and enclosing the outlet opening in the hopper whereby the bottom wall of said inlet portion extends away from said hopper in the general direction the material is traveling in passing through said opening.

The construction and operation of apparatus embodying the invention will become readily apparent as the disclosure progresses and particularly points out features and advantages considered of special importance and of general application although shown and described, for purposes of illustration, as being applied to a silage handling apparatus. And in this connection, the present invention may be considered as consisting of the various combinations of elements and parts constructed and/or correlated as is more fully set forth in the detailed description and appended claims, reference being had to the accompanying drawing illustrating an embodiment of the invention, and in which:

Fig. 1 is a plan view of a silage blower with a part broken away to better show a conveyer drive;

Fig. 2 is a  e view of the structure shown in Fig. 1;

Figure 3:
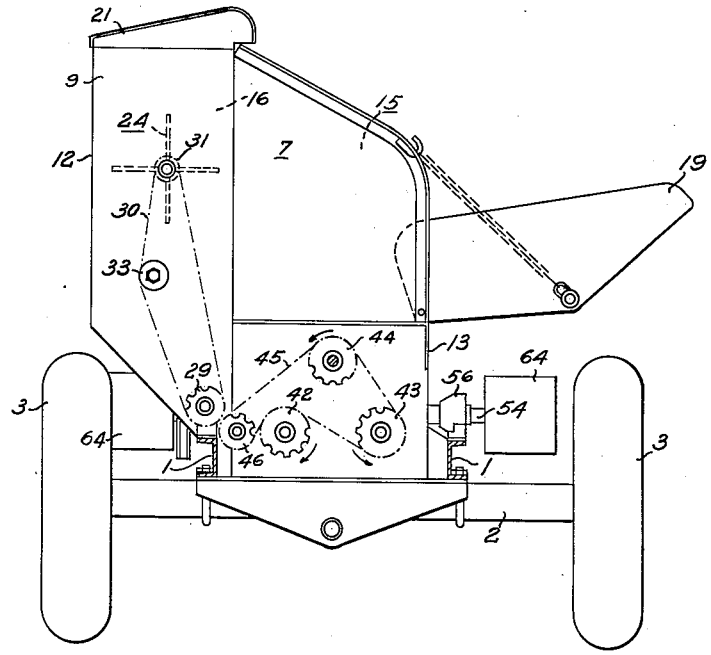
Fig. 3 is a sectional view taken on line III—III of Fig. 1.

Referring to Figs. 1 and 2 of the drawings, it will be seen that the invention may be applied to a portable silage handling apparatus comprising a generally rectangular frame structure 1 having a transverse axle member 2 mounting a pair of ground engaging wheels 3 and having a forwardly extending tongue or draft portion 4 which may be supported, when detached from the draw bar of a draft vehicle (not shown), by means of a pedestal element 6. An elongated hopper-like structure 7 is mounted on frame structure 1 generally forward of axle member 2 and a rotary impeller 8 is also mounted on frame structure 1 generally rearward of axle member 2.

Hopper structure 7 comprises end walls 9 and 11, side walls 12 and 13, and a vertical partition 14 dividing the interior of structure 7 into a main hopper portion 15 and an auxiliary hopper portion 16. Portion 15 is provided with a bottom wall 17 and portion 16 is provided with a trough-shaped bottom wall 18. Outer side wall 13 of hopper portion 17 is formed in part by a hinged material receiving apron 19, and the top of auxiliary portion 16 is preferably closed by a cover member 21 (see Fig. 3). The lower forward end of auxiliary portion 16 is in continuous communication with the adjacent lower end of main portion 15 through a downwardly inclined passage or duct 22 (see Fig. 4).

Auxiliary portion 16 has operatively mounted therein a forwardly feeding screw conveyer 23 disposed in adjacent parallel relation to the troughed bottom thereof, and a material agitator 24 disposed in spaced overlying and generally parallel relation with respect to conveyer 23. The forward end of conveyer 23 is provided with one or more straight radial flights 26 adapted to feed forwardly moving material laterally into passage 22. The opposite ends of conveyer 23 and of agitator 24 are rotatably supported in alined pairs of end-wall carried bearings 27 and 28, respectively. The forward end of conveyer 23 and of agitator 24 are provided with shaft extensions mounting drivingly alined sprocket wheels 29 and 31, respectively. And the rear end of agitator 24 is also provided with a shaft extension mounting a V-belt pulley 32. The front wall 9 of auxiliary portion 16 also mounts a chain tightening idler sprocket 33 operatively alined with the sprockets 29 and 31. A chain 30 drivingly connects sprockets 29, 31 and 32.

Figure 4:
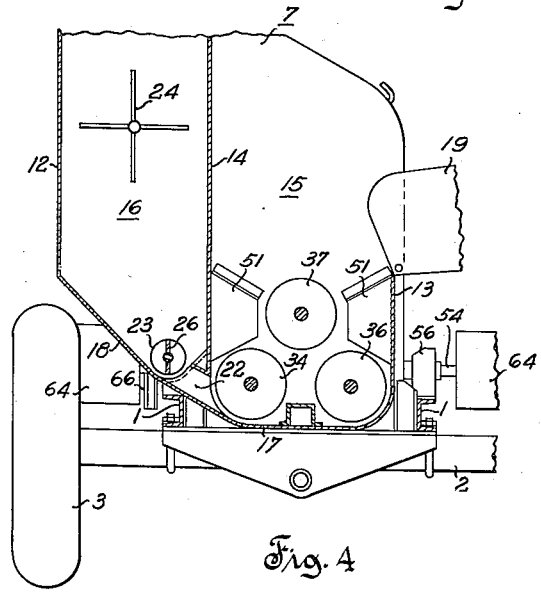
Fig. 4 is a sectional view taken on line IV—IV of Fig. 1.

Main portion 15 has operatively mounted therein a pair of rearwardly feeding screw conveyers 34 and 36 disposed in adjacent parallel relation to the plain surface of bottom wall 17 and in spaced side-by-side and generally parallel relation with respect to each other, and a third forwardly feeding screw conveyer 37 disposed in generally parallel overlying relation with respect to the conveyers 34 and 36 and approximately midway between same. The opposite ends of conveyers 34, 36 and 37 are mounted in alined pairs of end-wall carried bearing structures 38, 39 and 41, respectively. And the forward ends of these three conveyers are provided with shaft extensions mounting sprocket wheels 42, 43 and 44, respectively, disposed in driving alinement. The front wall 9 also mounts a second chain tightening idler sprocket 46 operatively alined with the sprockets 42, 43 and 44. A chain 45 drivingly connects sprockets 42, 43, 44 and 46. The rear end of overlying conveyer 37 is also provided with a shaft extension mounting a sprocket wheel 47. The rear end wall 11 mounts a belt tightening idler pulley 48 operatively alined with the pulley 32. Conveyer 37 has its forward end provided with one or more straight radial flights or paddles 49 adapted to feed forwardly moving material away therefrom and generally toward the forward ends of the underlying conveyers 34 and 36. In this connection, it should be noted that passage 22 is in effect approximately tangent to the adjacent side portion of bottom wall 17 of main hopper portion 15 and is also adjacent the outer side of conveyer screw 34, as shown in Fig. 4. The interior of main portion 15 is provided adjacent the rear end thereof with a pair of opposed material directing hollow baffles 51 disposed adjacent opposite sides of forwardly feeding conveyer 37 and in proximate overlying relation with respect to the discharge end of conveyers 34 and 36. The end wall 11 of structure 8 is provided with a generally rectangular discharge opening 53 having a vertical width slightly greater than the diameter of conveyer screws 34, 36 and having a horizontal length approximately equal to the width of main portion 15, as shown in Fig. 5.

The rotor element of impeller 8 comprises a shaft 54 having opposite end portions journaled in alined bearings 56 mounted on opposite sides of frame structure 1, having a pair of annular hub portions 57 secured thereto in axially spaced relation with respect to each other and with respect to the bearing mounted journal portions thereof, and having similar groups of circumferentially spaced radial arms or spokes 58 rigidly secured to each hub portion 57 with the arms of the groups in axial alinement. Trough-shaped impeller blades 59 are secured to the axially alined outer end portions of arms 58 with the trough of the blades facing in the direction of rotor rotation as indicated by the arrow on Fig. 2. And the rotor is enclosed in a generally cylindrical casing structure 61 rigidly supported on frame structure 1 and having a pair of circumferentially spaced inlet and outlet portions 62 and 63, respectively. Inlet portion 62 extends away from casing 61 in a direction which is in general opposite to the direction of impeller rotation, whereas outlet portion 63 extends away from casing 61 in a direction which is in general the same as the direction of impeller rotation. Inlet portion 62 encloses the discharge opening 53 in end wall 11 of main portion 15 and is preferably constructed so as to have a cross sectional area and shape conforming with that of opening 53. And the effective length of impeller blades 59 is substantially equal to the horizontal length of opening 53 and to the conforming dimension of inlet portion 62. In general, it is preferable to mount shaft 54 for rotation about a horizontal axis disposed approximately at right angles to the longitudinal axis of conveyer screws 34 and 36.

The opposite ends of shaft 54 extend outwardly beyond bearings 56 and may have mounted thereon pulleys or the like 64 adapted to be belted or otherwise operatively connected with any suitable power source such as a pulley on the power take-off shaft of a tractor engine or other prime mover (not shown). One end portion of shaft 54 also mounts a V-belt pulley 66 drivingly alined with a V-belt pulley 67 journaled on a parallel shaft 68 and being drivingly connectable therewith through a conventional clutch 69 adapted to be shifted by actuation of a link 71 having one end connected with the clutch and having its other end connected with one end of a shift lever 72. Shaft 68 is rotatably journaled in a casing structure 73 rigidly mounted on casing 61 and including a gear box portion 74 wherein shaft 68 is drivingly connected through a meshed pinion and gear (not shown) with a laterally projecting shaft 76 mounting a V-belt pulley 77 drivingly alined with the V-belt pulley 32 and with idler pulley 48. Shaft 76 also mounts a sprocket wheel 78 drivingly alined with sprocket wheel 47 on the adjacent end of conveyer 37, and these two sprockets are drivingly connected by a chain 79. In this connection, pulleys 66 and 67 are drivingly connected by a belt 80 and pulleys 77, 48 and 32 are drivingly connected by a belt 81.

Figure 5:
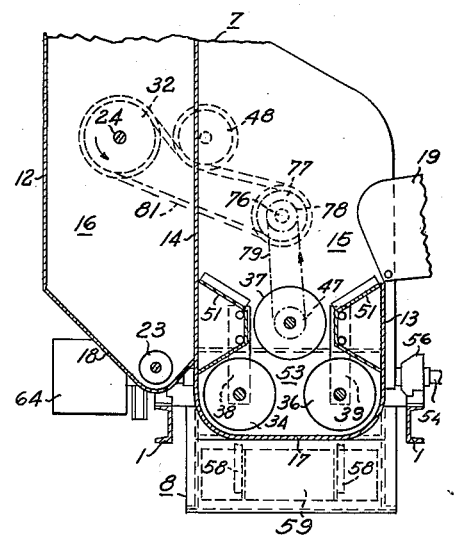
Fig. 5 is a sectional view taken on line V—V of Fig. 1.

It should now be obvious that with shaft 54 being driven in the direction indicated by the arrows on Figs. 1 and 2, pulley 67 will rotate in the same direction, and if clutch 69 is engaged, shaft 76, pulley 77, sprocket wheel 78, sprocket wheel 44 and pulley 32 will all rotate in the same direction, i. e., clockwise as viewed in Fig. 5. Consequently, agitator 24 and screw conveyers 23 and 37 will also rotate in a clockwise direction as viewed in Fig. 5, or if viewed as seen in Fig. 3, in a counterclockwise direction. However, since sprocket wheel 44 is on the forward end of conveyer 37 and is chain connected with the underlying sprocket wheels 42 and 43 on the adjacent ends of conveyers 34 and 36 in the manner shown in Fig. 3, it should also be obvious that the conveyers 34 and 36 rotate in opposite directions and that conveyer 36 rotates in the same direction as conveyer 37.

In this connection, the construction of screw conveyers 23, 34, 36 and 37 and the manner of driving same are such that when impeller shaft 54 is rotated in the direction indicated by the arrows on Figs. 1 and 2, conveyer 23 operates to feed material present in the lower part of hopper portion 16 forwardly therethrough towards and through downwardly inclined discharge passage 22, the conveyers 34 and 36 operate simultaneously to feed material present in the lower part of hopper portion 15 rearwardly therethrough toward and through discharge opening 53, and conveyer 37 operates to feed material present in hopper portion 15 above the conveyers 34 and 36 forwardly therethrough toward a point adjacent the front wall 9 thereof and then laterally away from its longitudinal axis due to the action of flight 49 thereon. However, as the material moves forward as just described, it also moves away from the conveyer and toward the side walls 13 and 14 of hopper portion 15 to replace the material continually moving downward through the opening or space provided between such walls and the opposed sides of conveyer 37. And while much of the material being delivered to the underlying conveyers 34 and 36 will pass through such openings, which in general have an effective width approximately equal to and preferably less than the diameter of the underlying conveyers, some of the material entering the spaces between the screw flights on conveyer 37 will be carried around to the underside of same and into the space between the conveyers 34 and 36.

If the apparatus hereinbefore described is to be used for treating and handling chopped silage, a preservative material, such as ground corn, is placed in hopper portion 16 and the chopped silage is delivered into hopper portion 15. And if clutch 69 is disengaged, assuming shaft 54 is being driven in the direction indicated by the arrows on Figs. 1 and 2, all that has to be done to deliver a mixture of chopped silage and ground corn to impeller 8, is to engage clutch 69. However, it may be desirable to engage clutch 69 before delivering silage to hopper portion 15 in order to insure ground corn being present for mixture with the silage entering conveyers 34 and 36 at a point adjacent the forward ends of deflectors 51. And in this connection, it has been found that a suitable mixture of chopped silage and preservative material is most readily and efficiently produced by introducing the preservative material, preferably in a dry state, tangentially into the bottom portion of hopper 15 at a point remote from the discharge end thereof. The conveyers 34 and 36 operate to thoroughly mix the silage and preservative material and to convey the resulting mixture toward and through discharge opening 53 and into and through the downwardly inclined tangential inlet portion 62 of impeller casing 61. The downward inclination of portion 62 affords a gravity conveying action tending to minimize compacting of the material passing therethrough and its tangential relation to cylindrical casing 61 materially reduces impact shock on the revolving blades as the material entering casing 61 is moving in the general direction of blade rotation. In addition, the tangential relation of inlet portion 62 to casing 61 in effect produces a material confining passage which diverges toward its discharge end thus tending to further minimize compacting of the material passing therethrough.

The rear end of conveyer 37 and hollow deflectors 51 coact to prevent material delivered into hopper portion 17 at a point immediately adjacent the rear end thereof from passing directly into contact with the discharge end portions of the conveyers 34, 36. And conveyer 37 is preferably of such size and/or so positioned in hopper portion 15 relative to the side walls thereof, i. e., relative to the opposed surface of wall 13 and partition 14, that the size of the opening above each of the conveyers 34 and 36 is such as will permit material to move downward therethrough, aided by the material distributing and opening clearing action of conveyer 37, at a rate conforming with the material feeding capacity of the underlying conveyer, taking into consideration of course the quantity of material being carried into the space between the conveyers 34 and 36 by the rotation of conveyer 37.

Consequently, if hopper portion 15 is suddenly completely or partially filled with a compactible adherent mass of comminuted material, such as chopped green silage, or if such a material is delivered into hopper portion 15 at a rate in excess of the material feeding capacity of conveyers 34 and 36, it should now be obvious that conveyer 37 will operate to positively deliver some of the material into the space between the conveyers 34 and 36, will operate in conjunction with deflectors 51 to prevent material being delivered into hopper portion 15 from passing directly into contact with the discharge ends of conveyers 34 and 36, will operate to prevent material from accumulating and packing adjacent the discharge ends of conveyers 34 and 36, will operate to prevent material from becoming lodged in or bridging over the openings provided between side walls 13 and 14 and the opposed sides of the conveyer, and will operate to distribute and deliver excess material to such openings throughout the entire length of same thus insuring a continuous uniform flow of material to conveyers 34 and 36 such as will result in a continuous maximum flow of material to and through discharge opening 53 with a minimum of compacting action.

The conveying of an adherent compactible mass of comminuted material from a hopper-like receiving structure to and through a confining duct or passage with a minimum of compacting action and in a continuous uniform stream not only eliminates plugging of an enclosed rotary impeller in material receiving communication with the passage, but it can be delivered tangentially into the outer peripheral path of a rotary impeller without imparting an objectionable degree of impact shock thereto, thereby permitting the use of a rotary impeller which has tangential inlet and discharge openings and which is far more efficient, at least for imparting a high velocity to comminuted material such as chopped silage, than is a centrifugal impeller wherein the material enters axially and is then moved radially outward and tangentially in passing to the discharge opening thereof.

Apparatus constructed in accordance with the present invention may vary in several respects from that herein shown and described for purposes of illustration as certain features are of general application insofar as the nature of the material to be handled is concerned while other features are of particular utility with respect to the treatment and/or handling of chopped silage and the like. And it should therefore be understood that it is not intended to limit the invention to the exact details of construction herein disclosed, as various modifications, embodying features of the invention, within the scope of the appended claims may occur to persons skilled in the art.

It is claimed and desired to secure by Letters Patent:

1. In combination, a hopper structure adapted to be suddenly completely or partially filled with a compactible adherent mass of comminuted material and having a trough-like portion provided with at least one end wall, a pair of elongated conveying elements operatively mounted within and adjacent the bottom of said portion so as to extend away from said end wall in adjacent side-opposed relation with respect to each other, said end wall having an opening therethrough alined with and exposing the opposed ends of both conveying elements, a third elongated conveying element operatively mounted within said portion so as to extend away from said end wall in generally parallel overlying relation with respect to said pair of elements and approximately midway between same, and means for operating said pair of elements to simultaneously move material longitudinally thereof and through said opening and for operating said third element to simultaneously move material longitudinally thereof and away from said opening, said third element having its end portion remote from said opening provided with a longitudinally and radially extending paddle constructed to direct material away from said end portion in a lateral direction with respect to its longitudinal axis.

2. In combination, a hopper structure adapted to be suddenly completely or partially filled with a compactible adherent mass of comminuted material and having a trough-like portion provided with at least one end wall, a pair of elongated conveying elements operatively mounted within and adjacent the bottom of said portion so as to extend away from said end wall in adjacent side-opposed relation with respect to each other, said end wall having an opening therethrough alined with and exposing the opposed end of both conveying elements, a third elongated conveying element operatively mounted within said portion in generally parallel relation with respect to the side walls thereof and so as to extend away from said end wall in generally parallel overlying relation with respect to said pair of elements and approximately midway between same, said third element having its opposite sides spaced from opposed portions of said side walls to provide openings therebetween having a transverse dimension slightly less than the diameter of either of said underlying elements limiting the passage of material downwardly therethrough to a rate commensurate with the conveying capacity of the underlying elements, and means for operating said pair of elements to simultaneously move material longitudinally thereof and through said opening and for operating said third element to simultaneously move material longitudinally thereof and away from said opening.

3. In combination, a hopper structure adapted to be suddenly completely or partially filled with a compactible adherent mass of comminuted material and having a trough-like portion provided with at least one end wall, a pair of elongated conveying elements operatively mounted within and adjacent the bottom of said portion so as to extend away from said end wall in adjacent side-opposed relation with respect to each other, said end wall having an opening therethrough alined with and exposing the opposed end of both conveying elements, a third elongated conveying element operatively mounted within said portion in spaced relation to the side walls thereof and so as to extend away from said end wall in generally parallel overlying relation with respect to said pair of elements and approximately midway between same, means for operating said pair of elements to simultaneously move material longitudinally thereof and through said opening and for operating said third element to simultaneously move material longitudinally thereof and away from said opening, and baffle members extending from said trough-like portion to positions adjacent opposite longitudinal sides of the end portion of said third element immediately above the discharge ends of said pair of elements so as to prevent material being delivered into the top part of said trough-like portion from passing directly into contact with the discharge ends of said pair of elements.

4. In combination, a hopper structure adapted to be suddenly completely or partially filled with a compactible adherent mass of comminuted material and having a portion of generally U-shaped cross sectional configuration provided with opposed end walls, a pair of screw type conveying elements operatively mounted within and adjacent the bottom of said portion in adjacent parallel relation to the side walls thereof and so as to extend from one to the other of said end walls in adjacent side-opposed and generally parallel relation with respect to each other, one of said end walls having an opening therethrough alined with and exposing the entire opposed end of both elements, a third screw type conveying element operatively mounted within said portion immediately above said opening and so as to extend from one to the other of said end walls in generally parallel overlying relation with respect to said pair of elements and approximately midway between same, said third element and the opposed portions of said side walls being spaced apart a distance such that the width of the opening along either side of said element is slightly less than the diameter of the underlying one of said pair of elements, means for operating said pair of elements to simultaneously move material longitudinally thereof and through said opening and for operating said third element to simultaneously move material longitudinally thereof and away from said opening, and means projecting over the discharge ends of said pair of elements and coacting with the adjacent end of said third element so as to prevent material being delivered into the top part of said U-shaped portion from passing directly into contact with the discharge ends of said pair of elements.

5. In combination, a hopper structure adapted to be suddenly completely or partially filled with a compactible adherent mass of comminuted material and having a trough-like portion provided with at least one end wall, a pair of elongated conveying elements operatively mounted within and adjacent the bottom of said portion so as to extend away from said end wall in adjacent side-opposed relation with respect to each other, said end wall having an opening therethrough alined with and exposing the opposed end of both conveying elements, a third elongated conveying element operatively mounted within said portion so as to extend away from said end wall in generally parallel overlying relation with respect to said pair of elements and approximately midway between same, a second hopper structure for comminuted preservative material disposed adjacent said trough-like portion and including means for conveying such a material into said trough-like portion at a point remote from said end wall opening therein and adjacent one side of one of said pair of conveying elements, and means for operating the preservative material conveying means of said second hopper structure, for operating said pair of elements to simultaneously move material longitudinally thereof and through said opening and for operating said third element to simultaneously move material longitudinally thereof and away from said opening.

6. In combination, a hopper structure adapted to be suddenly completely or partially filled with a compactible adherent mass of comminuted material and having a trough-like portion provided with at least one end wall, a pair of elongated conveying elements operatively mounted within and adjacent the bottom of said portion so as to extend away from said end wall in adjacent side-opposed relation with respect to each other, said end wall having an opening therethrough alined with and exposing the opposed end of both conveying elements, a third elongated conveying element operatively mounted within said portion so as to extend away from said end wall in generally parallel overlying relation with respect to said pair of elements and approximately midway between same, said third element having its end portion remote from said opening constructed to direct material away from said end portion in a lateral direction with respect to its longitudinal axis, a second hopper structure for comminuted preservative material disposed adjacent said trough-like portion and including means for conveying such a material into said trough-like portion at a point remote from said end wall opening therein and adjacent one side of one of said pair of elements, and means for operating the preservative material conveying means of said second hopper structure, for operating said pair of elements to simultaneously move material longitudinally thereof and through said opening and for operating said third element to simultaneously move material longitudinally thereof and away from said opening.

7. In combination, a hopper structure adapted to be suddenly completely or partially filled with a compactible adherent mass of comminuted material and having a portion of generally U-shaped cross sectional configuration provided with opposed end walls, a pair of screw type conveying elements operatively mounted within and adjacent the bottom of said portion in adjacent parallel relation to the side walls thereof and so as to extend from one to the other of said end walls in adjacent side-opposed generally parallel relation to each other, said pair of elements being so mounted for rotation that opposed surfaces thereof move downwardly, one of said end walls having an opening therethrough aligned with and exposing the entire opposed ends of said elements, a third screw type conveying element operatively mounted within said portion immediately above said opening and so as to extend from one to the other end walls in generally paralley overlying relation with respect to said pair of elements and approximately midway between same, said third element being spaced from said side walls a distance such that the width of the opening along either side of said element is substantially equal to the diameter of either one of said pair of underlying elements, means projecting over the discharge ends of said pair of elements and coacting with the adjacent end of said third element so as to prevent material being delivered into the top part of said U-shaped portion from passing directly into contact with the discharge ends of said pair of elements, means for operating said pair of elements to simultaneously move material longitudinally thereof and through said opening and for operating said third element to simultaneously move material longitudinally thereof and away from said opening, and said third element having its end portion remote from said opening constructed to move material, supplied by said third element and by material being deposited into said U-shaped portion, away from said end portion in a lateral direction with respect to its longitudinal axis.

CHARLES J. SCRANTON.
BRANTFORD G. ELLIOTT.

REFERENCES CITED

The following references are of record in the file of this patent:

UNITED STATES PATENTS

| Number | Name | Date |
|---|---|---|
| 742,591 | Clark | Oct. 27, 1903 |
| 843,806 | Groves | Feb. 12, 1907 |
| 946,475 | Talley | Jan. 11, 1910 |
| 1,189,663 | Carson | July 4, 1916 |
| 1,288,025 | Kennedy | Dec. 17, 1918 |
| 1,563,101 | Offenhauser | Nov. 24, 1925 |
| 1,794,326 | Sierer | Feb. 24, 1931 |
| 1,862,752 | Jones et al. | June 14, 1932 |
| 1,908,882 | Birkenbeuel | May 16, 1933 |
| 2,324,042 | Swenson | July 13, 1943 |